United States Patent [19]

Hecht

[11] Patent Number: 4,673,953
[45] Date of Patent: Jun. 16, 1987

[54] INTERPIXEL NULL SUPPRESSION FOR OPTICAL IMAGE BARS

[75] Inventor: David L. Hecht, Menlo Park, Calif.

[73] Assignee: Xerox Corporation, Stamford, Conn.

[21] Appl. No.: 808,709

[22] Filed: Dec. 13, 1985

[51] Int. Cl.$^4$ .................... G01D 9/42; G01D 15/14
[52] U.S. Cl. ................................ 346/108; 346/160; 350/358
[58] Field of Search ............... 346/107 R, 108, 160; 358/300, 302; 350/353, 355, 356, 357, 358

[56] References Cited

U.S. PATENT DOCUMENTS

| | | | |
|---|---|---|---|
| 4,281,904 | 8/1981 | Sprague et al. | 350/356 |
| 4,367,925 | 1/1983 | Sprague et al. | 350/355 |
| 4,396,252 | 8/1983 | Turner | 350/355 |
| 4,437,106 | 3/1984 | Sprague | 346/160 |
| 4,450,459 | 5/1984 | Turner et al. | 346/160 |
| 4,483,596 | 11/1984 | Marshall | 350/385 |
| 4,492,435 | 1/1985 | Banton et al. | 350/360 |
| 4,626,102 | 12/1986 | Storck | 350/358 |

OTHER PUBLICATIONS

John Gosch, "Linear Led Array has 300 Pixel/in. Resolution," Electronics Week, Jan. 21, 1985.
"Light Gates Give Data Recorder Improved Hardcopy Resolution," Electronics Design, Jul. 19, 1979, pp. 31–32.
"Polarizing Filters Plot Analog Waveforms," Machine Design, vol. 51, No. 17, Jul. 26, 1979, p. 62.
"Data Recorder Eliminates Problem of Linearity", Design News, Feb. 4, 1980, pp. 56–57.

Primary Examiner—E. A. Goldberg
Assistant Examiner—Mark Reinhart

[57] ABSTRACT

An optical image bar having a spatial light modulator includes means for decomposing the spatially modulated output radiation of the modulator into a plurality of mutually orthogonal, laterally offset, redundantly modulated, optical field distributions for producing an essentially null-free image, without significantly affecting the resolution of the image bar.

13 Claims, 7 Drawing Figures

INTERPIXEL NULL SUPPRESSION FOR OPTICAL IMAGE BARS

FIELD OF THE INVENTION

This invention relates to optical image bars and, more particularly, to methods and means for suppressing unwanted interpixel intensity nulls in their output images.

BACKGROUND OF THE INVENTION

As a matter of definition, an "optical image bar" comprises an array of optical picture element ("pixel") generators for converting a spatial pattern, which usually is represented by the information content of electrical input signals, into a corresponding optical intensity profile. Although there are a variety of applications for these image bars in a number of different fields, a significant portion of the effort and expense that have been devoted to their development has been directed toward their application to electrophotographic printing, where they may prove to be a relatively low cost and reliable alternative to the flying spot raster scanners which have dominated that field since its inception. Optical displays may also benefit from the use of such image bars, although their application to that field has not been a principle focus of the research that has been performed.

Several different types of optical image bars have been proposed, including some which embody electrically addressable LED arrays (see "Linear LED Array Has 300 Pixel/In. Resolution," *Electronics Week,* Jan. 21, 1985, p. 21), others which embody electro-mechanical spatial light modulators (see a commonly assigned U.S. Pat. No. 4,492,435 of M. E. Banton et al., which issued Jan. 8, 1985 on a "Multiple Array Full Width Electro Mechanical Modulator"), and still others which embody electrooptic spatial light modulators (see another commonly assigned U.S. Pat. No. 4,281,904 of R. A. Sprague et al., which issued Aug. 4, 1981 on a "TIR Electro-Optic Modulator with individually Addressable Electrodes"). Also see, "Light Gates Give Data Recorder Improved Hardcopy Resolution," *Electronic Design,* July 19, 1979, pp. 31-32; /"Polarizing Filters Plot Analog Waveforms," *Machine Design,* Vol. 51, No. 17, July 26, 1979, p. 62; and "Data Recorder Eliminates Problem of Linearity," *Design News,* Feb. 4, 1980, pp. 56-57. While these known image bars are based on diverse technologies, they all have finite spatial addressing capacities (i.e., they are "discrete image bars") because there are only certain, predetermined coordinates ("addresses") in image space upon which they can center pixels. Consequently, if the diameter of the individual output pixels produced by such an image bar is less than their pitch (i.e., the center-to-center displacement of the pixels on the output image plane), there inherently are interpixel intensity nulls. The spatial frequency of these intensity nulls sometimes is sufficiently high that they can be masked by overexposing the image, but that is not a particularly attractive null suppression technique because it degrades the image quality, requires additional optical power, and reduces the overall exposure latitude.

Some of the more interesting image bar proposals relate to TIR (total internal reflection) electrooptic spatial light modulators. In keeping with the teachings of a commonly assigned U.S. Pat. No. 4,396,252 of W. D. Turner, which issued Aug. 2, 1983 on "Proximity Coupled Electro-Optic Devices," such a modulator characteristically comprises a set of laterally separated, individually addressable electrodes which are maintained closely adjacent a reflective surface of an optically transparent electrooptic element, such as a lithium niobate crystal. A modulator of that type normally is operated with substantially the full width of its electrooptic element being illuminated by a linearly polarized, transversely collimated light beam, so when voltages representing the adjacent pixels of a linear pixel pattern (i.e., a line length set of data samples) are applied to its individually addressable electrodes, the wavefront of the light beam has its phase and polarization spatially modulated in accordance with the pixel pattern for a given line of an image. As a general rule, of course, successive sets of data samples are sequentially applied to the electrodes, thereby causing the modulator to serially modulate the wavefront of the light beam as a function of time in accordance with a time sequenced series of pixel patterns.

For image bar applications of such modulators, prior proposals typically have contemplated the use of Schlieren imaging optics for imaging the modulator onto its output image plane. The frequency plane filtering of a Schlieren imaging system effectively transforms the spatially modulated output radiation of the modulator into a series of correspondingly modulated intensity profiles, but there are embodiments in which a polarization analyzer may be used alone or in combination with a Schlieren stop to read out the pixel pattern represented by the data samples applied to an electrooptic modulator. Thus, as used herein, the phrase "electrooptic image bar" applies to all image bars which embody electrooptic spatial light modulators, regardless of whether the modulators are read out by spatial filtering and/or by polarization filtering.

There have been several significant developments which have reduced the cost and increased the reliability of TIR electrooptic spatial light modulators. Among the improvements that are of particular relevance to image bar applications of these modulators are a "differential encoding" technique that is described in a commonly assigned U.S. Pat. No. 4,450,459 of W. D. Turner et al., which issued May 22, 1984 on "Differential Encoding for Fringe Field Responsive Electro-Optic Line Printers," and an electrical interconnect strategy that is described in a commonly assigned U.S. Pat. No. 4,367,925 of R. A. Sprague et al., which issued Jan. 11, 1983 on "Integrated Electronics for Proximity Coupled Electro-Optic Devices." Briefly, it has been shown that the number of electrodes which such a modulator requires, when used in an image bar having a predetermined resolution, may be reduced by a factor of almost two if the input data samples are differentially encoded on a line-by-line basis prior to being applied to the modulator. Furthermore, it has been demonstrated that more or less conventional VLSI circuit technology can be employed to integrate the modulator electrodes with their addresssing and drive electronics, thereby facilitating the orderly and reliable distribution of data samples to the relatively large number of electrodes which customarily are required for reasonably high resolution printing.

Electrooptic image bars intrinsically are spatially coherent devices. Axially illuminated TIR electrooptic spatial light modulators (i.e., those wherein the incident radiation propagates in a direction that is essentially parallel to the optical axis of the modulator) are especially well suited for use in higher resolution image bars, but they inherently tend to produce interpixel intensity nulls because they spatially modulate the incident radiation by diffractively scattering optical energy into positive and negative diffraction orders which are more or less angularly symmetrical about a zero order or unmodulated component. These positive and negative diffraction orders (collectively referred to herein as "higher order diffraction components") define the upper and lower spatial frequency sidebands, respectively, of the modulated radiation, so they coherently contribute to the effective spatial modulation bandwidth of the modulator, provided that their relative phase is preserved. Unfortunately, however, whenever such spatially coherent radiation is brought to focus to form an image, adjacent pixels of opposite phase destructively interfere with one another, thereby producing undesireable interpixel intensity nulls. For example, differential encoding produces adjacent pixels of opposite phase.

Others who have attempted to develop essentially null-free image bars embodying axially illuminated TIR electrooptic spatial light modulators have recognized that the unwanted interpixel intensity nulls are caused by destructive interference, so their work is especially noteworthy. As described in a commonly assigned U.S. Pat. No. 4,437,106 of R. A. Sprague, which issued Mar. 13, 1984 on "Method and Means for Reducing Illumination Nulls in Electro-Optic Line Printers," one of the prior null suppression proposals suggests scattering light into the null regions in accordance with a pattern having an angular orientation and/or a spatial frequency which tends to inhibit the ability of the unaided eye to resolve the nulls, even when the imaging is performed at normal exposure levels. This approach preserves the internal spatial coherency of the output radiation of the image bar, while reducing the observable affects of the nulls. Another commonly assigned U.S. Pat. No. 4,483,596 of S. W. Marshall, which issued Nov. 20, 1984 on "Interface Suppression Apparatus and Means for a Linear Modulator," describes an alternative proposal pursuant to which a polarization retardation plate or the like is provided for orthogonally polarizing the positive and negative diffraction orders of the modulated output radiation of the image bar, thereby preventing them from destructively interfering with one another. That effectively suppresses the interpixel intensity nulls, but it does so at the cost of reducing the effective spatial bandwidth of the image bar by a factor of two because it destroys the relative phase information between the positive and negative diffraction orders. Moreover, it may be relatively difficult and expensive to take full advantage of this orthogonal polarization concept in practice because of the wide range of incident angles at which light from different points along an image bar of appreciable width would fall on the polarization retardation plate.

SUMMARY OF THE INVENTION

In accordance with the present invention, an optical image bar having a spatial light modulator includes means for decomposing the spatially modulated output radiation of the modulator into a plurality of mutually orthogonal, laterally offset, redundantly modulated, optical field distributions. If the output radiation from the modulator is intensity modulated, the decomposed field distributions are simultaneously superimposed directly on an output image plane, thereby causing them to spatially sum with one another on an intensity basis. Otherwise, the decomposed field distributions are transformed into respective, correspondingly modulated, laterally offet, optical intensity profiles, and those intensity profiles are then superimposed on the output image plane. Regardless of whether an intermediate modulation conversion step is required or not, the intensity profiles define essentially identical (i.e., mutually redundant) pixel patterns. Accordingly, their cumulative image plane displacement is selected to be less than the center-to-center displacement or pitch of the pixels defined by any one of them, so their mutually redundant pixels map onto the image plane on spatially adjacent, laterally displaced centers to form an essentially null-free image, without significantly affecting the resolution of the image bar. Even more specifically, the cumulative displacement of the intensity profiles preferably is selected to be approximately equal to the nominal nonredundant pixel pitch minus the nominal image plane diameter of the individual pixels, thereby causing the redundant pixels to overwrite any existing interpixel intensity nulls within the individual intensity profiles, while preventing them from materially overlapping with any nonredundant pixels.

To apply this invention to image bars having spatially coherent modulators, the spatially modulated output radiation of the modulator is decomposed to provide a plurality of mutually orthogonal, but spatially self-coherent, redundantly modulated optical field distributions which are laterally offset from one another. These field distributions then are transformed into respective laterally offset, redundantly modulated intensity profiles which, in turn, are simultaneously superimposed on the output image plane to spatially sum with each other on an intensity basis. For example, if the image bar comprises a polychromatically illuminated TIR electrooptic spatial light modulator, the spatially modulated output radiation of the modulator suitably is chromatically laterally dispersed, thereby decomposing it into two or more mutually orthogonal, laterally displaced, spectral components. To reduce the optical distortion of the decomposed components, the dispersion advantageously is performed by a pair of substantially identical, oppositely oriented prisms, which preferably are disposed between the modulator and the imaging optics of the image bar to take advantage of the telecentricity which usually exists in that region.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to a single illustrated embodiment, it is to be understood that there is no intent to limit it to that embodiment. On the contrary, the aim is to cover all modifications, alternatives and equivalents falling within the spirit and scope of the invention as defined by the appended claims.

Figure 1:
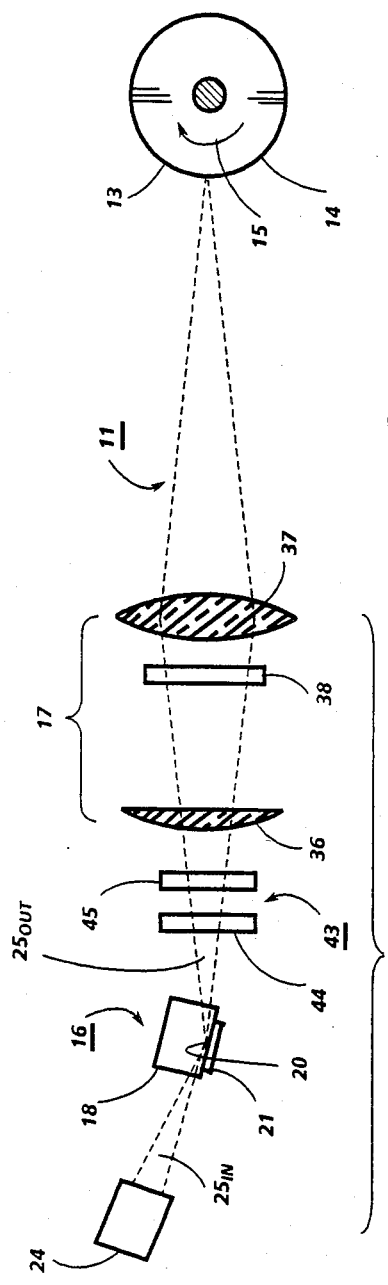
FIG. 1 is a schematic saggital plane view of a line printer embodying the present invention.
Figure 2:
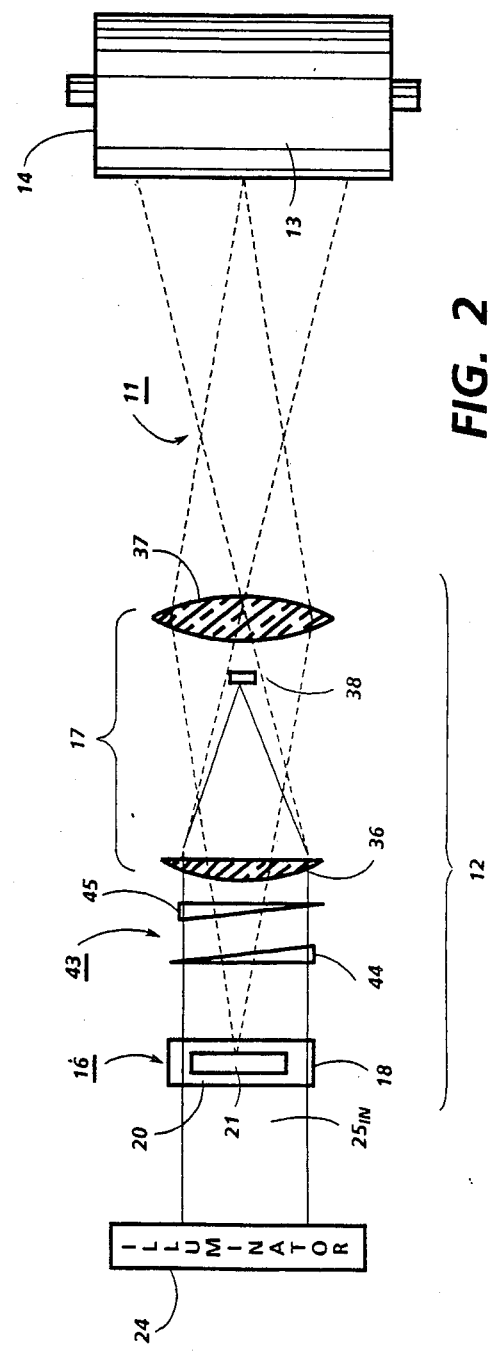
FIG. 2 is a schematic tangential plane view of the printer shown in FIG. 1.
Figure 3:
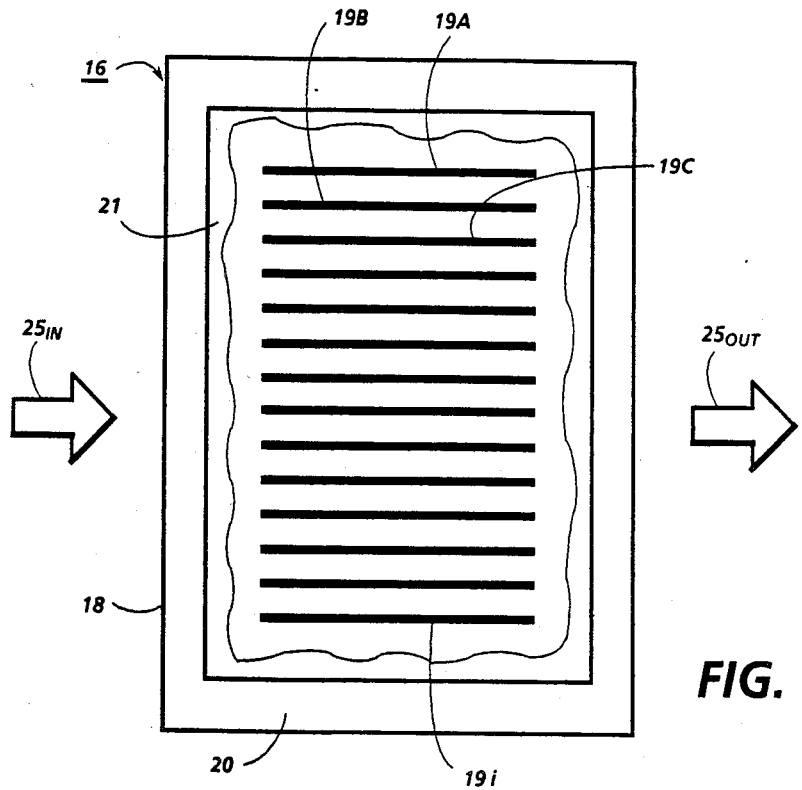
FIG. 3 is a partially cut-away, enlarged bottom view of the spatial light modulator for the printer shown in FIGS. 1 and 2.
Figure 4:
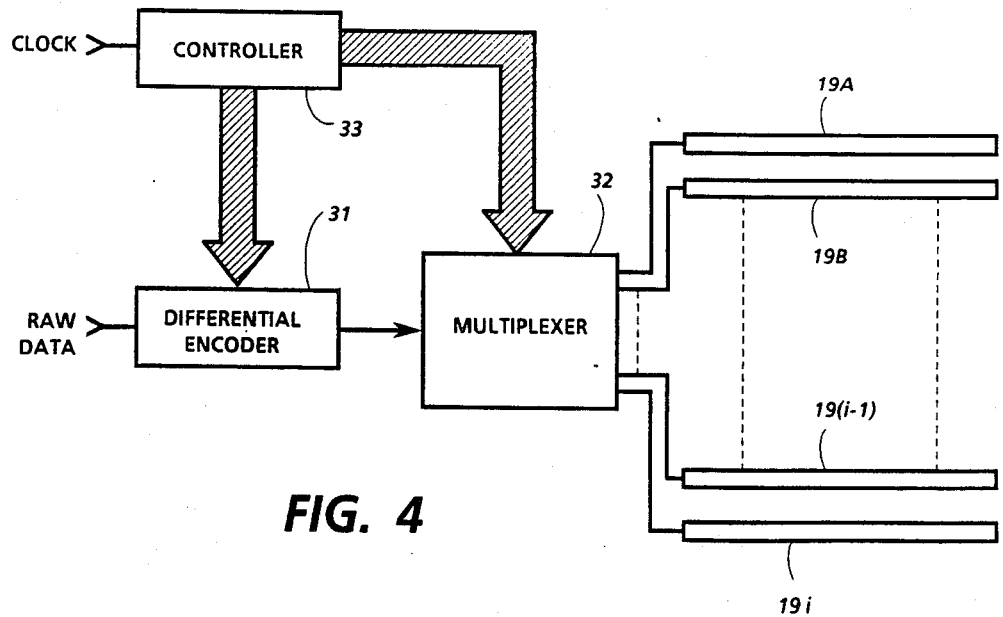
FIG. 4 is a simplified block diagram of a system for applying differentially encoded input data samples to the electrodes of the modulator shown in FIG. 3.

Turning now to the drawings, and at this point especially to FIGS. 1 and 2, there is an electrophotographic line printer 11 having an electrooptic image bar 12 for printing an image on a photosensitive recording medium 13. As shown, the recording medium 13 is a photoconductively coated drum 14 which is rotated (by means not shown) in the direction of the arrow 15. However, there are other xerographic and non-xerographic recording media which could be used, including photoconductively coated belts and plates, as well as photosensitive films and coated papers. The recording medium 13, therefore, can be more generally described as being a photosensitive medium which is exposed while advancing across an image plane in a crossline or line pitch direction (i.e., the "sagittal direction") relative to the image bar 12. As will be appreciated, the electrooptic image bar 12 represents only one of several image bar technologies with which the present invention can be utilized to advantage, but it is a particularly relevant example because of its spatial coherency In keeping with accepted practices, the image bar 12 comprises an electrooptic spatial light modulator 16 and a Schlieren imaging system 17. The modulator 16 characteristically includes an optically transparent electrooptic element 18, such as an optically polished, y-cut crystal of $LiNbO_3$, and a plurality of individually addressable electrodes $19_a-19_i$ (FIGS. 3 and 4). As will be seen, the electrodes $19_a-19_i$ are located on, or closely adjacent, a longitudinal reflective surface 20 of the electrooptic element 18. For example, as in other modulators of this type, the electrodes $19_a-19_i$ may be integrated with their addressing and drive electronics on a VLSI silicon circuit 21, and the modulator 16 may then be assembled by employing suitable means (not shown) for holding the electrodes $19_a-19_i$ firmly against the reflective surface 20. Typically, the electrodes $19_a-19_i$ extend lengthwise of the electrooptic element 18 (i.e., parallel to its optical axis) in mutually parallel alignment and are spaced apart laterally (i.e., in the "tangential direction") on essentially equidistant centers.

A polychromatic illuminator 24, such as a moderately broad spectrum light emitting diode (LED) or LED array (the spectrum of which is discussed in more detail hereinafter), supplies an input light beam $25_{in}$ which is transversely collimated and, if necessary, expanded (by means not shown) to axially illuminate substantially the full width of the electrooptic element 18. As a general rule, the light beam $25_{in}$ is linearly polarized along the tangential direction. Moreover, it usually is applied at a near grazing angle of incidence with respect to the reflective surface 20 of the electrooptic element 18, so that it totally internally reflects therefrom. Also, there generally are means (not shown) for bringing the light beam $25_{in}$ to a wedge shaped focus on the reflective surface 20 of the electrooptic element 18, thereby enabling the imaging system 17 to establish a relatively straightforward object/image relationship between the modulator 16 and the recording medium 13 (i.e., the output image plane).

In operation, the modulator 16 spatially modulates the phase and/or polarization of the wavefront of the light beam $25_{in}$ in accordance with a time sequenced series of pixel patterns, thereby providing a spatially modulated output beam $25_{out}$. To that end, successive sets of data samples are sequentially applied to the electrodes $19_a-19_i$, preferably in differentially encoded form. As is known, differential encoding causes the voltage levels of the raw input data samples for any given line of an image to determine the sample-to-sample voltage transitions of the differentially encoded data samples for that line, so it simplifies the construction of the modulator 16 by eliminating the need for ground or reference plane electrodes (not shown). For that reason, as shown in FIG. 4, there is an encoder 31 for differentially encoding the raw data samples on a line-by-line basis, a multiplexer 32 for rippling the encoded data samples onto the electrodes $19_a-19_i$, and a controller 33 for synchronizing the encoder 31 and the multiplexer 32. The incomong or raw data samples customarily flow in a serial stream at a predetermined synchronous data rate, so the encoder 31 and the multiplexer 32 ordinarily are synchronized by the controller 33 to operate at that rate. Nevertheless, it will be evident that a suitable buffer (not shown) could be provided for temporarily storing either the raw data or the encoded data should it be found, for example, that a rate change is required or that asynchronous operation is desired.

Returning to FIGS. 1 and 2, a more or less conventional central dark field or central bright field Schlieren imaging system typically is employed for reading out the pixel patterns carried by the spatially modulated output radiation $25_{out}$ of the modulator 16. More particularly, as illustrated, there is a central dark field Schlieren imaging system 17 comprising a field lens 36 and an imaging lens 37 for bringing the zero order and the higher order diffraction components of the spatially modulated light beam $25_{out}$ to focus on an opaque stop 38 and on the recording medium 13, respectively. The stop 38 is centrally located in the rear focal plane of the lens 36, so it blocks the transversely collimated, zero order components of the light beam $25_{out}$, as indicated by the solid line rays in FIG. 2. However, the higher order diffraction components (collectively represented by dashed line rays in FIG. 2) scatter around the stop 38 and then are collected by the imaging lens 37 to form an image of the modulator 16 on the recording medium 13. As will be understood, if a central bright field imaging system were used, the phase-to-intensity conversion characteristics of the imaging system would be logically inverted.

In accordance with the present invention, the spatially modulated output radiation $25_{out}$ of the modulator 16 is decomposed into a plurality of laterally offset, self-coherent, redundantly modulated optical field distributions which are generally orthogonal with respect to one another. The Schlieren imaging system 17 converts these field distributions into respective, laterally offset, correspondingly modulated, intensity profiles while bringing them to focus simultaneously on the recording medium 13, there causing them to spatially sum with one another on an intensity basis to form an image. In view of the phase and amplitude fidelity of the individual optical field distributions, it will be evident that the effective modulation bandwidth of the image bar 12 is minimally affected by the decomposition of the light beam $25_{out}$. Specifically, the spatial modulation transfer function (MTF) of the image bar 12 is substantially unaffected for frequencies up to the reciprocal of the nominal pixel pitch. Accordingly, edges of the pixels are sharp enough for single pixel resolution. However, as explained in additional detail hereinbelow, the spatial summation of the intensity profiles produces an essentially null-free image.

To accommodate the illustrated embodiment of the invention, the illuminator 24 is selected to have a continuous or a discontinuous output spectrum of sufficient breadth to cause the light beam $25_{in}$ to have at least two mutually orthogonal (i.e., substantially incoherent) spectral components, each of which is adequately intense across the full width of the modulator 16 to enable the imaging system 17 to form an image of the modulator 16 on the recording medium 13. Furthermore, there is a passive optical means, such as a prism system 43, for laterally dispersing the modulated light beam $25_{out}$ in accordance with its spectrally distinct components, thereby decomposing it into a plurality of laterally offset, generally orthogonal, redundantly spatially modulated optical field distributions. The prism system 43 preferably is optically aligned between the modulator 16 and the Schlieren imaging system 17 to take advantage of the telecentricity that exists in that region.

As will be appreciated, the chromatically dispersed optical field distributions need not be strictly orthogonal with respect to one another in the purest mathematical sense. On the contrary, optical fields are "mutually orthogonal" within the meaning of this disclosure, provided that they do not optically interfere with one another sufficiently to produce detectable intensity nulls on the recording medium 13 and/or sufficiently to impair the ability of the image bar 12 to independently control the brightness values of adjacent, non-redundant pixels. As an example of the significance of the foregoing definition, it is noted that the spectral components of a polychromatic light beam having a center wavelength of about 800 nm may be readily dispersed in practice (and, therefore, be characterized as being "spectrally distinct") if there is a minimum spectral separation between them of approximately 5 nm. Typically, the line printing rate of the printer 11 (FIGS. 1 and 2) is so low (e.g., 1,000–10,000 lines/second) that all of the dispersible spectral components of the light beam $25_{out}$ are mutually orthogonal under the above definition; i.e., optical beat frequencies are many orders of magnitude higher.

Figure 7:
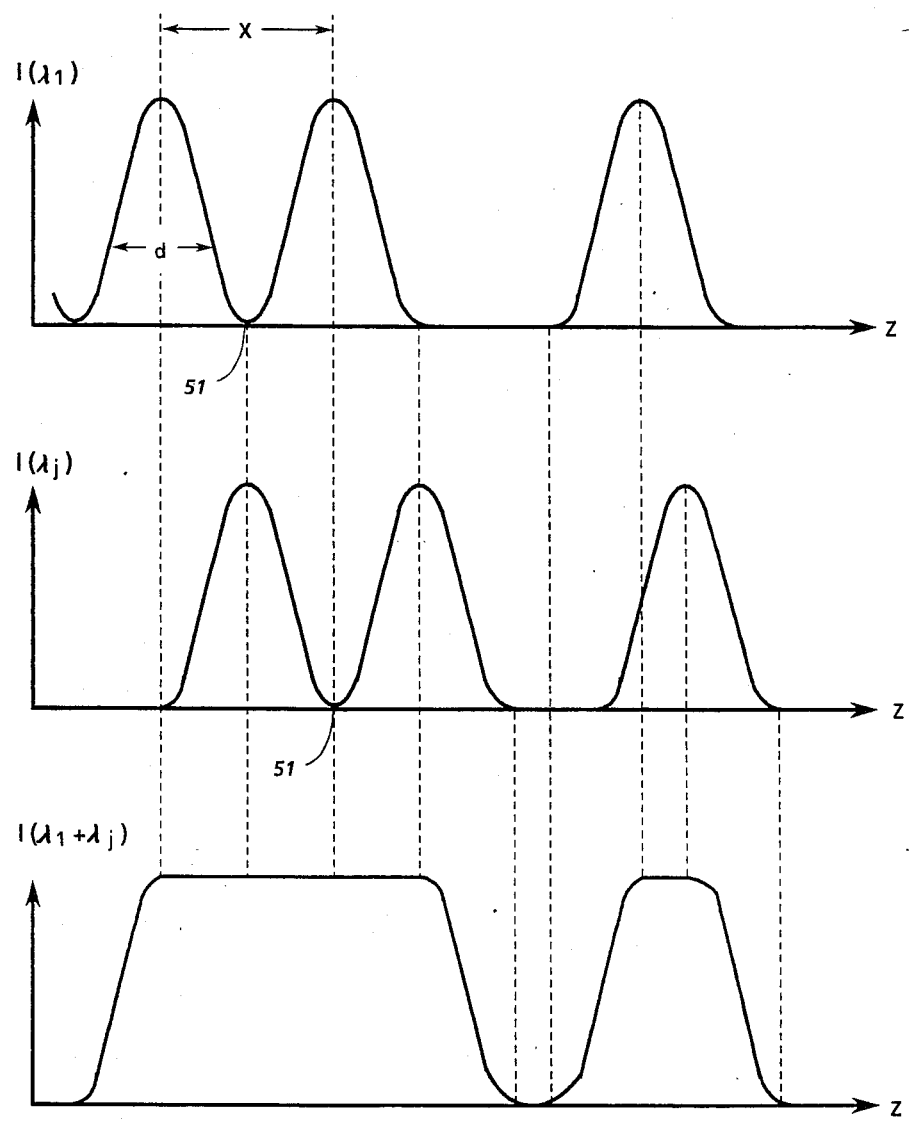
FIG. 7 is a spatial intensity diagram illustrating the spatial summation of a pair of laterally offset, redundantly modulated, mutually orthogonal intensity profiles, whereby interpixel intensity nulls are suppressed in accordance with this invention.

The image plane diameter, d, of the pixels printed by a conventional spatially coherent electrooptic image bar characteristically is approximately equal to one half of their image plane pitch, X (see FIG. 7). As a general rule, therefore, the input light beam $25_{in}$ need only contain two adequately intense, spectrally distinct components for suppressing the interpixel intensity nulls. While additional spectra usually are unnecessary, they can be tolerated, unless they result in overexposure of the image, or cause a loss of imaging resolution, or lead to an unacceptable reduction in the edge sharpness of the printed pixels. Consequently, it should be understood that the spectrum of the light beam $25_{in}$ may be limited by passing it through a bandpass optical filter (not shown) if the unfiltered output spectrum of the illuminator 24 is too broad. Furthermore, it will be evident that a weighted spectral filter (also not shown) may be utilized to adjust the relative intensities of the mutually orthogonal spectral components of the light beam $25_{in}$ should there be a need or desire, for example, to compensate for spectral variations in the energy density of the illuminator 24, the efficiency of the modulator 16, and/or the sensitivity of the recording medium 13. Spectral filtering also may be employed to tailor the shape of the pixels because the spatial sum of the chromatically decomposed intensity profiles essentially represents the convolution of the monochromatic response of the modulator 16 with the spectral power distribution of the illuminator 24. For example, a sharp edge spectral cut-off filter may be utilized to sharpen the edges of the printed pixels. Still another option is to provide a filter having two relatively narrow, widely separated passbands (i.e., the spectral separation of the passbands being substantially greater than their widths) to produce a close equivalent to a dual, discrete spectrum source. Preferably, any such filtering is performed within or immediately adjacent the illuminator 24.

Figure 5:
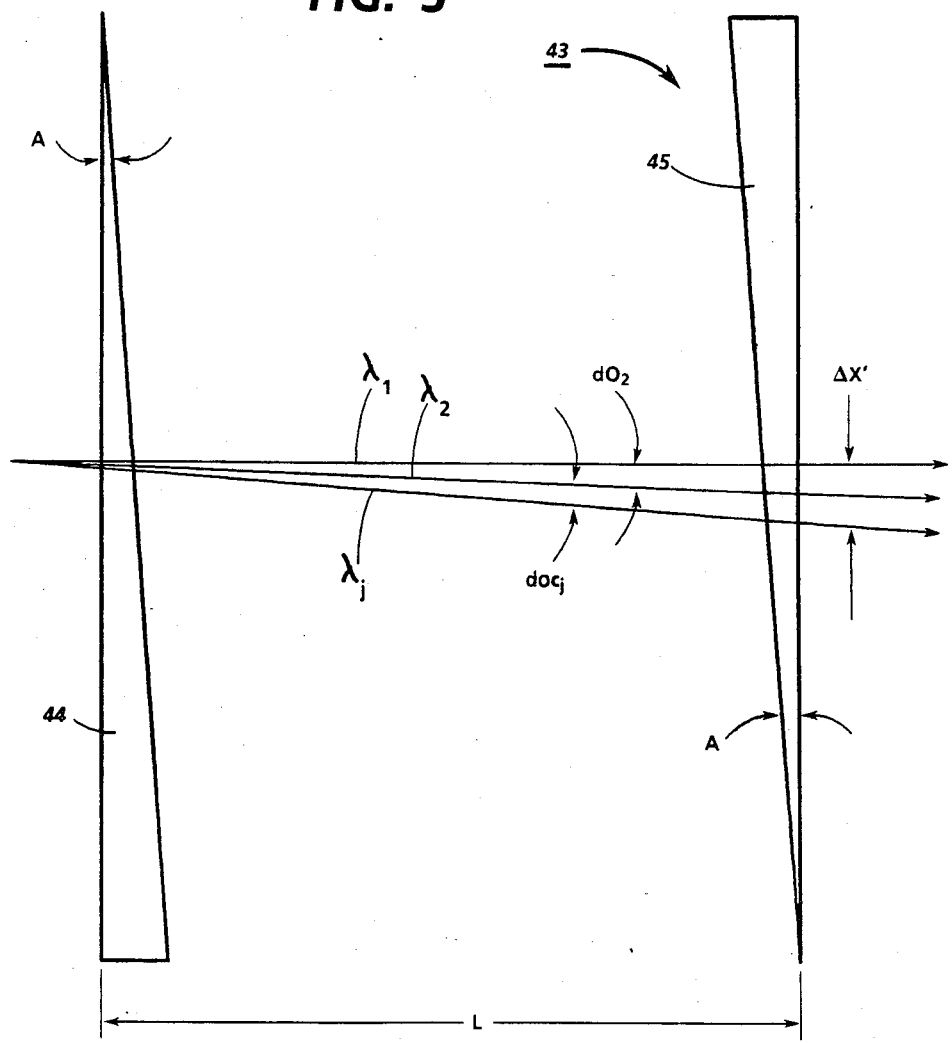
FIG. 5 is an enlarged tangential plane view of the prism system for the printer shown in FIGS. 1 and 2.
Figure 6:
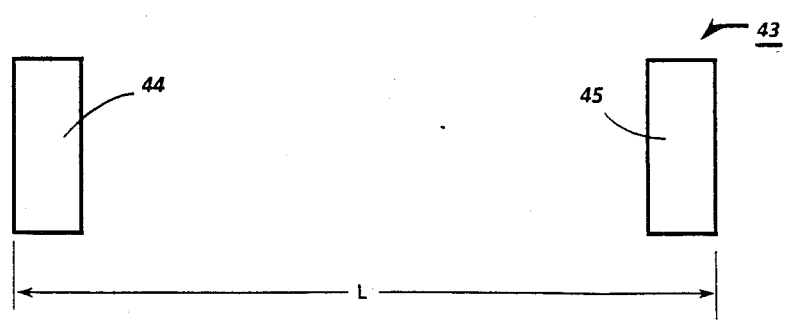
FIG. 6 is an enlarged sagittal plane view of the prism system.

Referring to FIGS. 5 and 6, the prism system 43 suitably comprises an optically aligned pair of substantially identical, oppositely oriented prisms 44 and 45, which are displaced from one another by a predetermined optical distance, L, to chromatically decompose the spatially modulated light beam $25_{out}$ into at least two laterally offset optical field distributions of different wavelengths. The prism 44 first angularly disperses the light beam $25_{out}$, and the prism 45 then counters or reverses the angular dispersion, thereby causing the decomposed field distributions to be substantially telecentric with respect to the modulator 12 (i.e., their principle rays are substantially normal to the modulator 12). Accordingly, the lateral displacement of the chromatically decomposed optical field distributions depends on the effective output spectrum breadth of the illuminator 24 (FIGS. 1 and 2), the angular dispersion caused by the prism 44, and the optical distance, L, between the prisms 44 and 45 (i.e., the effective optical arm length of the dispersion). Any relatively fine adjustments that may be required to more or less optimize the displacement preferably are made by increasing or decreasing the optical arm length, L. Typically, the prism 44 and 45 are thin prisms.

As will be seen, the imaging system 17 need not be materially modified to accommodate the prism system 43. Some minor alignment adjustments might be needed if the average deviation of the prism system 43 is sufficient to require that the optical axis of the imaging system 17 be slightly offset (not shown) from the optical axis of the modulator 12, but that is a second order consideration involving no more than routine realignment of the optics.

Turning to FIG. 7, it will be recalled that monochromatic illumination of the modulator 12 yields pixels having an image plane diameter, d, which is roughly one half their image plane pitch, X, thereby creating interpixel intensity nulls. In accordance with this invention, however, an essentially null image is produced by causing the imaging system 17 (FIGS. 1 and 2) to simultaneously superimpose, on the image plane 13, a plurality (N, where N>2) of redundantly modulated, mutually orthogonal, intensity profiles $I(\lambda_1) \ldots I(\lambda_j)$ (where $j=2, 3 \ldots N$) which are laterally offset from one another sufficiently to overwrite the intensity nulls, but insufficiently to materially alter the brightness values of any of the individual pixels. As shown, the null-free intensity profile $I(\lambda_1+\lambda_j)$ is the spatial intensity sum of two laterally offset intensity profiles $I(\lambda_1)$ and $I(\lambda_j)$, $j=2$, each of which contains interpixel intensity nulls, as at 51.

Returning to FIGS. 5 and 6 with the foregoing in mind, it will now be understood that the cumulative lateral offset, $\Delta X'$, between the two most widely dispersed of the decomposed field distributions (as measured at the output of the prism system 43) suitably is:

$$\Delta X' = X/2M \tag{1}$$

where M = the image magnification ocurring between the imaging optics 17 and the recording medium 13 (FIGS. 1 and 2).

If the prisms 44 and 45 are thin prisms so that all angles involved are less than about 0.1 radian, there is a straightforward and reasonably accurate correlation between (a) the angular dispersion, $\delta\alpha_j$, at the prism 44 of the most widely dispersed wavelength, $\lambda_j$, of the light beam 25$_{out}$ with respect to the wavelength $\lambda_1$ which experiences the least angular deviation, and (b) the cumulative lateral offset, $\Delta X'$ of the decomposed field distributions:

$$\delta\alpha_j = \Delta X'/L \tag{2}$$

Moreover, the angular dispersion, $\delta\alpha_j$, which the wavelength $\lambda_j$ experiences when the prism 44 is a thin prism is to a first approximation:

$$\delta\alpha_j = A(n_j - n_1) \tag{3}$$

where:
A = the apex angle of the prism 44;
$n_1$ = the index of refraction of the prism 44 corresponding to the wavelength I1; and
$n_j$ = the index of refraction of the prism 44 corresponding to the wavelength $\lambda_j$.

Thus, the following design rule for a thin prism embodiment of the invention is obtained by substitution:

$$n_j - n_1 = \Delta X'/AL = \delta_n \tag{4}$$

Equation (4) is expressed in generalized terms, but it describes the prism system 43 by reference to the two spectral extremes $\lambda_1$ and $\lambda_j$ of the light beam 25$_{out}$, so its utility can be fully demonstrated while focusing on the spectral extremes, with the understanding that the light beam 25$_{out}$ may contain intermediate spectral components (not shown). Fur purposes of this example, it will be assumed that the demagnified nominal non-redundant pixel pitch, $X/M = 2\Delta X$, of the image bar 12 is 0.010 mm and that the effective optical arm length, L, between the prisms 44 and 45 is 50.0 mm. Furthermore, it also will be assumed that the wavelengths $\lambda_1$ and $\lambda_2$ are 755 nm and 820 nm, respectively, and that prisms 44 and 45 are composed of BK-7 optical glass, so the relevant refractive indices $n_1$ and $n_2$ are about 1.51032 and about 1.51170, respectively. Thus, equation (4) can be solved to show that appropriate apex angle, A, for the prisms 44 and 45 is approximately 0.0725 radians or, in other words 4.15 degrees for the assumed case.

CONCLUSION

In view of the foregoing, it will now be understood that the present invention provides a relatively precise and well controlled method and means for suppressing interpixel intensity nulls in the output images of image bars, including spatially coherent image bars, without reducing their effective modulation bandwidth or degrading their resolution.

What is claimed:

1. In combination with an optical image bar for supplying spatially modulated light to form an image composed of a sequence of pixel patterns on an output image plane, each of said pixel patterns containing a plurality of individual pixels and having a nominal image plane pixel pitch, each of said pixels having an image plane diameter that is less than said pixel pitch such that there tend to be interpixel intensity nulls; the improvement comprising
    first optical means disposed between said image bar and said image plane for decomposing said light into a plurality of mutually orthogonal, laterally offset, optical field distributions which are redundantly modulated in accordance with said pixel pattern, and
    second optical means aligned with said first optical means for transforming said field distributions into respective mutually orthogonal, redundantly modulated, laterally offset intensity profiles and for bringing said intensity profiles to focus simultaneously on a recording medium, thereby causing them to sum with one another on an intensity basis
    said intensity profiles being laterally offset from one another on said image plane sufficiently to substantially overwrite said interpixel intensity nulls, but insufficiently to cause significant alteration of any neighboring pixels.

2. The improvement of claim 1 wherein
    said image bar is a spatial light modulator with a double sideband spatial modulation bandwidth, whereby said modulated light contains upper and lower spatial frequency sidebands having amplitude and phase distributions determined by said pixel patterns, and
    the amplitude and phase distributions of said upper and lower frequency sidebands are substantially faithfully reproduced within each of said orthogonal field distributions.

3. The improvement of claim 2 wherein
    said light is transversely collimated and is spatially modulated laterally with respect to said image bar,
    said first optical means are disposed in a telecentric region between said image bar and said second optical means, and
    said second optical means performs a modulation conversion process on said optical field distributions to provide said intensity profiles.

4. The improvement of claim 3 wherein
    said image bar comprises an illuminator for supplying input light, and an electrooptic spatial light modulator for spatially modulating the phase of said input light to provide said modulated light.

5. The improvement of claim 4 wherein
    said modulator comprises an electrooptic element having a tangentially extending reflective surface, and a plurality of individually addressable electrodes, said electrodes being adjacent said surface and being distributed thereacross on substantially equidistant centers,
    said input light is applied to said modulator at a grazing angle of incidence with respect to said reflective surface, whereby said input light is totally internally reflective therefrom, and said input light is spatially modulated laterally of said electrooptic element in response to voltages applied to said electrodes to provide said modulated light.

6. The improvement of claim 5 wherein said input light is spatially phase modulated in response to said voltages, whereby said decomposed optical field distributions are redundantly phase modulated, and said second optical means is a Schlieren imaging system for transforming said phase modulated field distributions into said redundantly modulated intensity profiles.

7. The improvement of claim 1 wherein said spatially modulated light is polychromatic and comprises at least two mutually orthogonal wavelengths, and said first optical means laterally disperses said modulated light in accordance with said wavelengths to provide said optical field distributions.

8. The improvement of claim 7 wherein said image bar is a spatial light modulator with a double sideband spatial modulation bandwidth, whereby said modulated light contains upper and lower spatial frequency sidebands at each of said wavelengths, said sidebands having amplitude and phase distributions vary as a function of time in accordance with said pixel patterns, and the amplitude and phase distributions of said upper and lower frequency sidebands are substantially preserved while said light is being dispersed in accordance with its wavelengths.

9. The improvement of claim 8 wherein sad modulated light is transversely collimated, and said first optical means are disposed in a telecentric region between said image bar and said second optical means.

10. The improvement of claim 9 wherein said first optical means is a wavelength dispersive prism system composed of a pair of substantially identical, oppositely oriented prisms which are optically aligned with each other.

11. The improvement of claim 10 wherein said image bar comprises a polychromatic illuminator for supplying input light, and an electrooptic spatial light modulator for spatially modulating said input light to provide said modulated light.

12. The improvement of claim 11 wherein said modulator comprises an electrooptic element having a longitudinally extending reflective surface, and a plurality of individually addressable electrodes, said electrodes being adjacent said reflective surface and being distributed thereacross on substantially equidistant centers said input light is applied to said modulator at a grazing angle of incidence with respect to said reflective surface, whereby said input light is totally internally reflected from said surface, and said input light is spatially modulated laterally of said electrooptic element in response to voltages applied to said electrodes to provide said modulated light.

13. The improvement of claim 12 wherein said input light is spatially phase modulated in response to said voltages, whereby said dispersively decomposed optical field distributions are redundantly phase modulated, and said second optical means is a Schlieren imaging system for transforming said phase modulated field distributions into said redundantly modulated intensity profiles.

* * * * *